(12) United States Patent
Cyborski et al.

(10) Patent No.: US 11,565,394 B2
(45) Date of Patent: Jan. 31, 2023

(54) DOUBLE REDUCTION GEAR TRAIN

(71) Applicant: SNAP-ON INCORPORATED, Kenosha, WI (US)

(72) Inventors: David A. Cyborski, Belvidere, IL (US); Joshua M. Beer, Mount Pleasant, WI (US); Matthew D. Patterson, Young Harris, GA (US)

(73) Assignee: Snap-on Incorporated, Kenosha, WI (US)

(*) Notice: Subject to any disclaimer, the term of this patent is extended or adjusted under 35 U.S.C. 154(b) by 239 days.

(21) Appl. No.: 16/665,845

(22) Filed: Oct. 28, 2019

(65) Prior Publication Data

US 2021/0122025 A1    Apr. 29, 2021

(51) Int. Cl.
*B25F 5/00* (2006.01)
*B25B 21/00* (2006.01)
*B25F 5/02* (2006.01)
*F16H 1/46* (2006.01)
*F16H 57/08* (2006.01)

(52) U.S. Cl.
CPC ............ *B25F 5/001* (2013.01); *B25B 21/004* (2013.01); *B25F 5/02* (2013.01); *F16H 1/46* (2013.01); *F16H 57/082* (2013.01)

(58) Field of Classification Search
CPC .......... B25F 5/001; B25F 5/02; B25B 21/004; F16H 1/46; F16H 57/082
USPC ....................................................... 173/216
See application file for complete search history.

(56) References Cited

U.S. PATENT DOCUMENTS

| 2,863,334 | A | | 12/1958 | Babcock |
| 4,346,630 | A | | 8/1982 | Hanson |
| 4,535,850 | A | | 8/1985 | Alexander |
| 4,597,453 | A | * | 7/1986 | Kilmer ................. H01R 43/033 173/171 |
| 4,728,876 | A | | 3/1988 | Mongeon et al. |
| 5,269,733 | A | * | 12/1993 | Anthony, III ......... B25B 21/026 173/171 |
| 6,039,126 | A | | 3/2000 | Hsieh |
| 6,123,271 | A | | 9/2000 | Delaney et al. |
| 6,176,322 | B1 | | 1/2001 | Wadge |

(Continued)

FOREIGN PATENT DOCUMENTS

| CN | 103600327 A | 2/2014 |
| CN | 207161630 U | 3/2018 |

(Continued)

OTHER PUBLICATIONS

Australian Examination Report No. 1 for corresponding AU Application No. 2020260376, dated Jun. 18, 2021, 9 pages.

(Continued)

*Primary Examiner* — Michelle Lopez
(74) *Attorney, Agent, or Firm* — Seyfarth Shaw LLP

(57) ABSTRACT

A tool with two sequential gear trains and gear carrier assemblies adapted to be recessed into internal gears. The internal gear assembly also prevents rotation of the internal gear assembly relative to a housing of the tool. For example, the internal gear assembly can include a first gear train and second gear train sequentially coupled to the first gear train, wherein a first ring gear and first planet gears of the first gear train are substantially similar to a second ring gear and second planet gears of the second gear train.

19 Claims, 5 Drawing Sheets

(56) References Cited

U.S. PATENT DOCUMENTS

| | | | |
|---|---|---|---|
| 6,196,943 B1 | 3/2001 | Chen | |
| 7,080,578 B2 | 7/2006 | Izumisawa | |
| 7,303,497 B1 | 12/2007 | Wige | |
| 7,314,097 B2 * | 1/2008 | Jenner | B25B 21/00 173/178 |
| 7,414,337 B2 | 8/2008 | Wilkinson et al. | |
| 8,545,363 B2 | 10/2013 | Roehm et al. | |
| 8,727,931 B2 | 5/2014 | Hafner | |
| 9,212,725 B2 | 12/2015 | Steckel et al. | |
| 9,233,461 B2 * | 1/2016 | Tomayko | B25F 5/00 |
| 9,266,228 B2 | 2/2016 | Hecht et al. | |
| 9,289,832 B2 | 3/2016 | Kishima et al. | |
| 9,289,886 B2 * | 3/2016 | Limberg | B25B 23/1405 |
| 9,415,497 B2 | 8/2016 | Hecht et al. | |
| 9,482,316 B2 | 11/2016 | Kurth | |
| 9,561,548 B2 | 2/2017 | Kishima, II | |
| 9,731,410 B2 | 8/2017 | Hirabayashi et al. | |
| 9,739,366 B2 | 8/2017 | Duerr | |
| 9,924,942 B2 | 3/2018 | Swayze et al. | |
| 2005/0252670 A1 | 11/2005 | Prell et al. | |
| 2006/0201688 A1 | 9/2006 | Jenner et al. | |
| 2008/0287247 A1 | 11/2008 | Pusateri | |
| 2010/0101815 A1 | 4/2010 | Kobayashi | |
| 2012/0322605 A1 | 12/2012 | Hirabayashi | |
| 2016/0318165 A1 | 11/2016 | Thorson et al. | |
| 2016/0354914 A1 | 12/2016 | Bartoszek et al. | |

FOREIGN PATENT DOCUMENTS

| | | |
|---|---|---|
| CN | 208364712 U | 1/2019 |
| DE | 202010012556 U1 | 3/2011 |
| EP | 2127812 A1 | 12/2009 |
| EP | 3031579 A1 | 6/2016 |
| FR | 2873052 B1 | 3/2007 |
| GB | 184370 A | 8/2021 |
| KR | 1020130047910 A | 5/2013 |
| TW | 200505638 A | 2/2005 |
| TW | I263551 | 10/2006 |
| WO | 0011372 A1 | 3/2000 |
| WO | 2012084350 A1 | 6/2012 |
| WO | 2017006956 A1 | 1/2017 |
| WO | 2018051873 A1 | 3/2018 |

OTHER PUBLICATIONS

Taiwan Office Action for corresponding TW Application No. 109137281, dated Jul. 2, 2021, 15 pages.
United Kingdom Combined Search and Examination Report for corresponding UK Application No. GB2016918, dated Apr. 14, 2021, 7 pages.
United Kingdom Examination Report for corresponding UK Application No. GB2016918, dated Nov. 2, 2021, 3 pages.
United Kingdom Combined Search and Examination Report for corresponding UK Application No. GB2115636.9, dated Nov. 9, 2021, 6 pages.
Canadian Office Action for corresponding CA Application No. 3,097,166, dated Dec. 22, 2021, 4 pages.
Examination Report No. 2 for corresponding Application No. 2020260376 dated Mar. 9, 2022, 3 pages.
Office Action for corresponding Application No. GB2209877.6 dated Aug. 11, 2022, 4 pages.

* cited by examiner

DOUBLE REDUCTION GEAR TRAIN

TECHNICAL FIELD OF THE INVENTION

The present invention relates generally to a gear train for a tool. More particularly, the present invention relates to a double reduction gear train that prevents rotation of various components of the tool.

BACKGROUND OF THE INVENTION

Many tools, such as ratchet wrenches, include a head and a housing. The head includes internal gear assemblies that transfer torque to a drive unit of the tool and eventually to a work piece. In many of these tools, these internal gear assemblies contain many different parts and are difficult to assemble. Further, over time and repeated use, the head can rotate or otherwise fail. For example, dropping the tool and cause the head to fail, or repeated use of the tool can cause the joints in the tool to rotate due to repeated torsional effects on the joints.

SUMMARY OF THE INVENTION

The present invention relates broadly to a tool, such as a ratchet type tool, with a gear train that simplifies assembly of the tool, prevents rotation of the gear train relative to a housing of the tool, and reduces rotation of gears to allow motion to be transferred to a ratchet mechanism, as desired. For example, the tool implements two sequential gear trains that contain substantially similar components to achieve a target gear train speed reduction. Further, the tool eliminates the need for additional parts to couple the components using gear carrier assemblies that are recessed into internal gears. In addition, the internal gears can be used to prevent rotation of the gear train relative to the housing, which allows parts to fit together naturally without additional parts to couple the components together.

In particular, the present invention broadly includes a tool having a motor for providing torque to a drive unit. The tool includes a first gear train adapted to receive torque from the motor, and a second gear train sequentially coupled to the first gear train. The second gear train is adapted to transfer the torque from the first gear train to the drive unit.

In another embodiment, the present invention broadly comprises a gear assembly for a tool having a motor for providing torque to a drive unit. The gear assembly includes a first gear train adapted to receive torque from the motor. The first gear train includes a first ring gear, first planet gears disposed in the first ring gear and operably coupled to the motor, and a first carrier coupled to the first planet gears. The gear assembly also includes a second gear train sequentially coupled to the first gear train. The second gear train is adapted to receive torque from the first gear train. The second gear train includes a second ring gear, second planet gears disposed in the second ring gear and operably coupled to the first carrier, and a second carrier coupled to the second planet gear. The second carrier is adapted to receive torque from the first gear train and transfer torque to the drive unit. The first and second planet gears may also be substantially similar.

In yet another embodiment, the present invention broadly includes a tool having a motor for providing torque to a drive unit. The tool includes a ratchet housing including a recess in an internal side wall of the ratchet housing. The tool also includes a first gear train disposed in the ratchet housing and that is adapted to receive torque from the motor. The first gear train includes a first ring gear including a first protrusion extending from an outer surface of the first ring gear, wherein the first protrusion is adapted to engage the recess and resist rotation of the first ring gear with respect to the ratchet housing. The tool may also include a second gear train sequentially coupled to the first gear train, wherein the second gear train is adapted to receive torque from the first gear train and transfer torque to the drive unit. The second gear train includes a second ring gear including a second protrusion extending from an outer surface of the second ring gear, wherein the second protrusion is adapted to engage the recess and resist rotation of the second ring gear with respect to the ratchet housing.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF PREFERRED EMBODIMENTS

Figure 1:
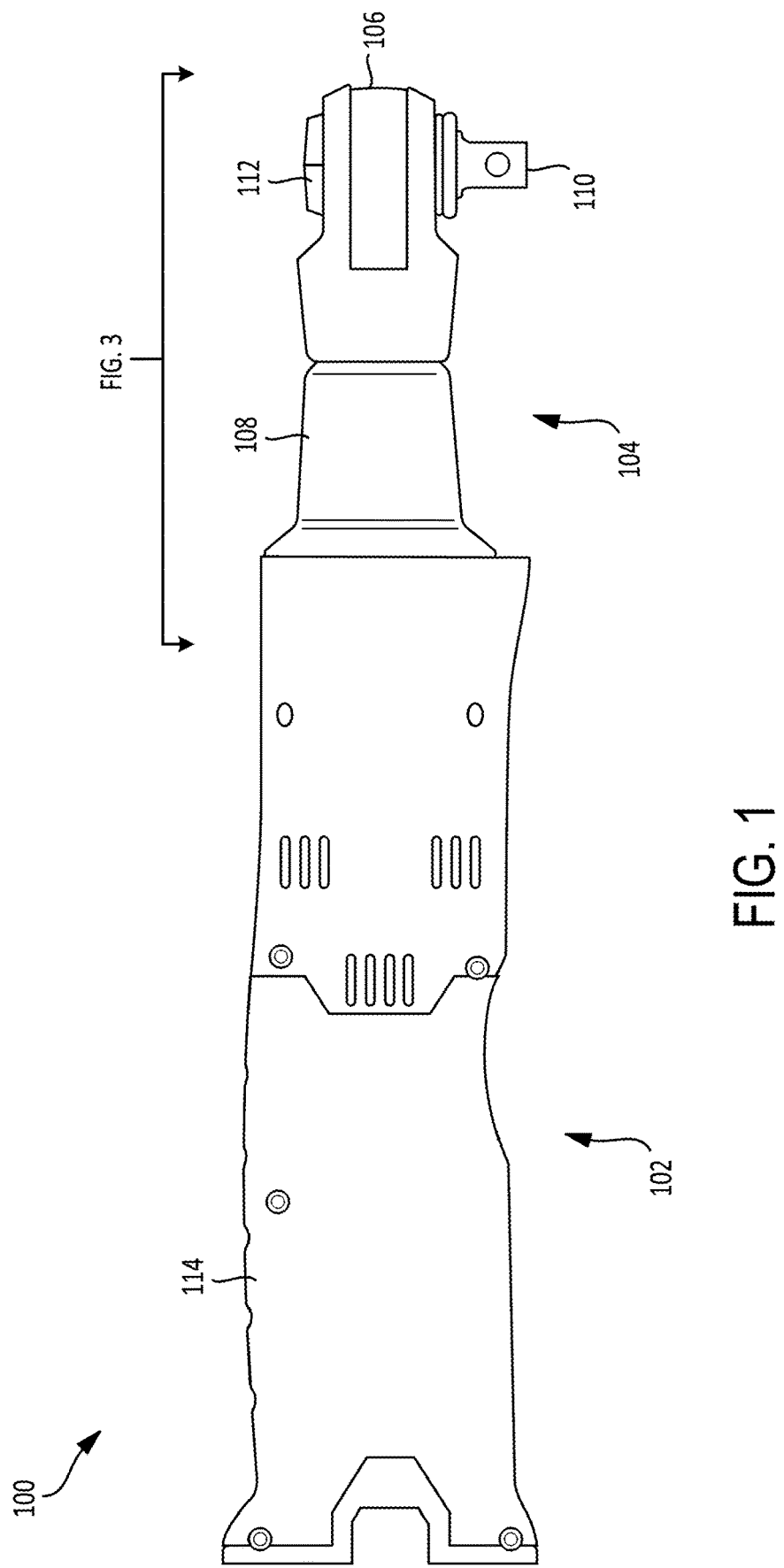
FIG. 1 is a side view of a tool according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to tools, such as ratchet type tools. The tool includes an internal gear assembly that simplifies manufacturing or assembly of the tool and reduces rotation of the gears to allow motion to be transferred to a ratchet mechanism, as desired, by utilizing substantially similar components in two sequential gear trains. The tool also includes gear carrier assemblies adapted to be recessed into internal gears to eliminate unnecessary components. The internal gear assembly also prevents rotation of the internal gear assembly relative to a housing of the tool. For example, the internal gear assembly can include a first gear train and second gear train that is sequentially coupled to the first gear train. The first and second internal gears can also each include protrusions extending from an external surface of each of the first and second internal gears that are adapted to engage with grooves or recesses formed in the housing to prevent rotation of the internal gear assembly with respect to the housing.

Referring to FIG. 1, a tool 100, such as, for example, a ratchet type tool, is illustrated. The tool 100 includes a handle portion 102 coupled to a driver portion 104. The driver portion 104 includes a ratchet head assembly 106 including a ratchet housing 108, drive or drive lug 110, and selector knob 112, for example. The drive 110 is adapted to apply torque to a work piece, such as a fastener, via an adapter, bit, or socket coupled to the drive 110, such as a bi-directional ratcheting square or hexagonal drive. As illustrated, the drive 110 is a "male" connector designed to fit into or cooperatively engage a female counterpart. However, the drive 110 may be a "female" connector designed to engage a male counterpart. The drive 110 may also be structured to directly engage a work piece without requiring coupling to an adapter, bit, or socket. The rotational direction of the drive 110 can be selected by rotation of the selector knob 112 to be either clockwise or counterclockwise.

The handle portion 102 may include a main housing 114 enclosing an electric motor, a switch assembly and one or more status indicators such as light emitting diodes, for example. The main housing 114 may be assembled from two or more clamshell housing portions fastened together and securely coupled to the ratchet head assembly 106. The main housing 114 may include a textured grip to improve a user's grasp of the tool 100 during torqueing operations.

In an embodiment, the tool 100 further includes a trigger (not shown) that can be actuated by a user to cause the tool 100 to operate. For example, the user can depress the trigger inwardly to cause power to be drawn from a power source and cause a motor to provide torque to the drive 110 in a desired rotational direction. Any suitable trigger or switch can be implemented without departing from the spirit and scope of the present invention.

Figure 2:
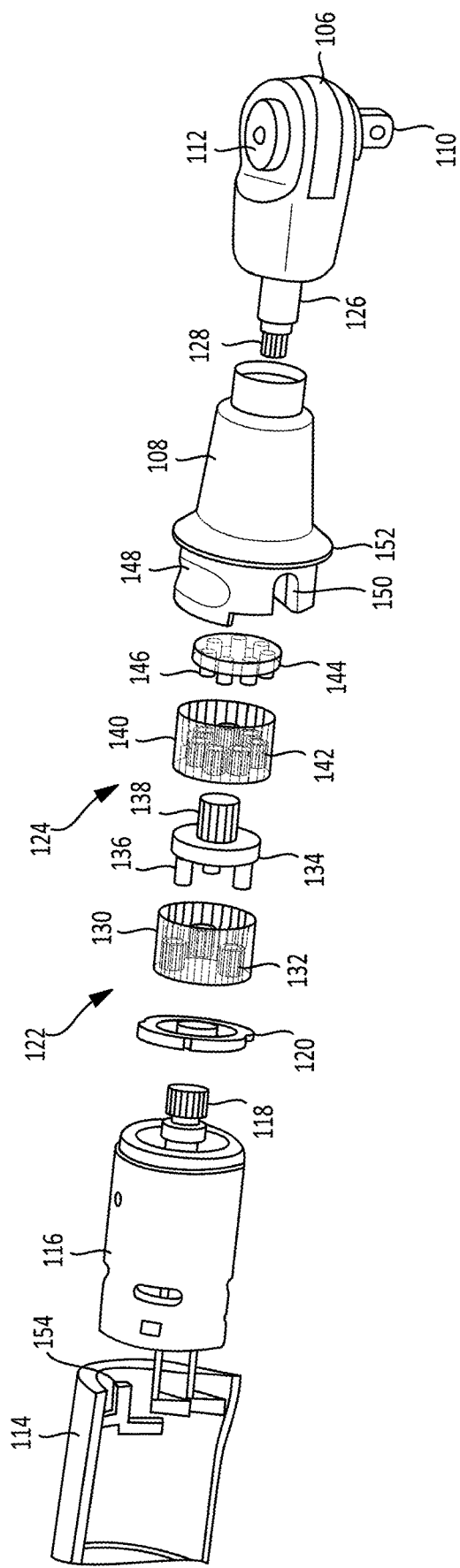
FIG. 2 is an exploded side perspective view of the head portion of the tool of FIG. 1.
Figure 3:
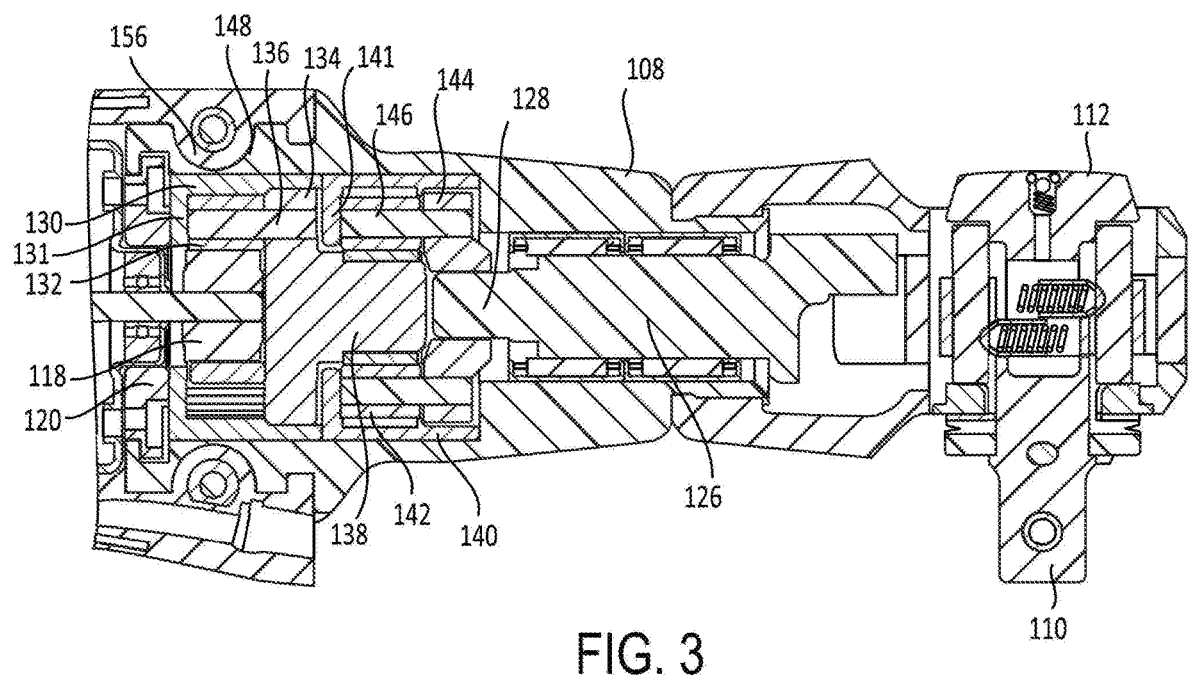
FIG. 3 is a cross sectional side view of a head portion of the tool of FIG. 1.
Figure 4:
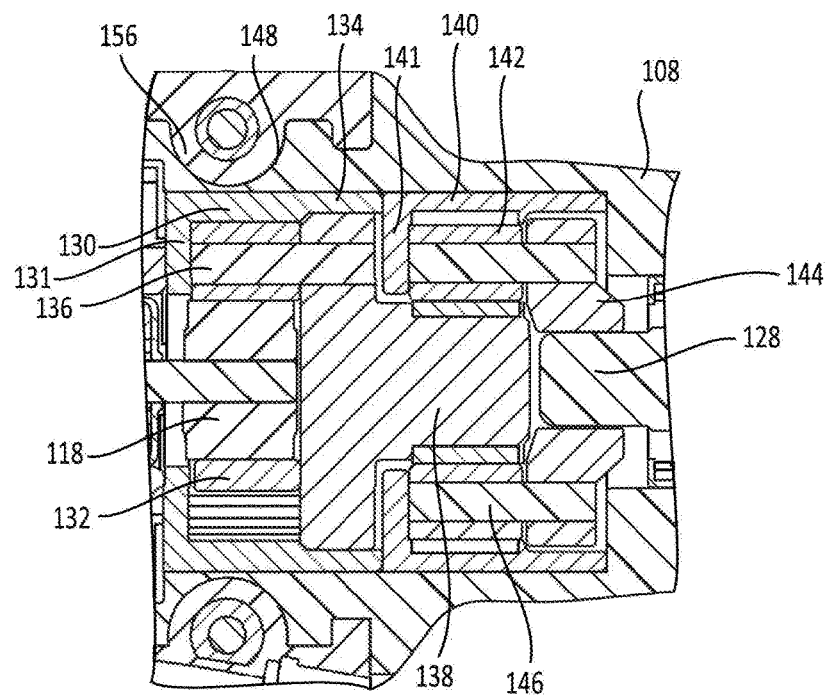
FIG. 4 is an enlarged cross-sectional side view of a gear carrier assembly of the tool of FIG. 3.

Referring to FIGS. 2-4, the tool 100 includes a motor 116, with a motor drive gear 118, that provides torque to the tool 100 and, in turn, to the drive 110. Further, a power source can be associated with the tool 100 to provide electronic or other forms of power to the tool 100, such as, for example, hydraulic or pneumatic, to drive the motor 116. In an embodiment, the power source can be housed in an end of the main housing 114, opposite the drive 110, midsection, or any other portion of the tool 100. The power source may also be an external component that is not housed by the tool 100, but that is operatively coupled to the tool 100 through, for example, wired or wireless means. In an embodiment, the power source is a battery.

The driver portion 104 includes the ratchet head assembly 106, including the ratchet housing 108, drive 110, and selector knob 112. The driver portion 104 may also include a motor plate 120, first gear train 122, and second gear train 124; and the ratchet head assemble may also include a crank shaft 126 with a crank shaft gear 128. The motor plate 120 is coupled to an end of the motor 116, with the motor drive gear 118 extending through the motor plate 120. The motor drive gear 118 rotates, which transfers rotational force to the first gear train 122, which transfers rotational force to the second gear train 124, and the second gear train 124 transfers the rotational force to the crank shaft 126 via the crank shaft gear 128, which transfers the rotational force to the drive 110 via the ratchet head assembly 106.

The first gear train 122 includes a first internal/ring gear 130, first planet gears 132 disposed in the first ring gear 130, and a first carrier 134. The first ring gear 130 includes first gear teeth disposed on an interior surface of the first ring gear 130. The first planet gears 132 similarly include gear teeth disposed on an exterior surface of each of the first planet gears 132 that mate with the first gear teeth of the first ring gear 130. The gear teeth of the first planet gears 132 also mate with gear teeth of the motor drive gear 118. While three first planet gears 132 are shown in the exemplary embodiment, it will be appreciated that the number of first planet gears 132 is not so limited and more or less first planet gears 132 may be implemented.

The first ring gear 130 may also be cup-like shaped with a first end portion 131 that is disposed proximal to the motor plate 120. The first end portion 131 along with the sides of the first ring gear 130 form the cup-like shape, and this cup-like shape allows the first ring gear 130 to receive and retain the planet gears 132. The first end portion 131 also includes an aperture that receives and allows the motor drive gear 118 to be disposed in engagement with the first planet gears 132. The first end portion 131 may be flat and abut the motor plate 120, and assist in holding the first ring gear 130 axially aligned with the motor 116.

The first carrier 134 includes first gear protrusions or carrier pins 136 that engage respective ones of the first planet gears 132. The first carrier 134 also includes a first gear portion 138 with gear teeth extending from an end opposite the first gear protrusions 136. The first carrier 134 may be recessed or disposed in an opening/cut-out in the first ring gear 130, as shown in FIG. 3, to further eliminate unnecessary parts to join or hold the components of the internal gear assembly and simplify the design of the tool 100. For example, as shown in FIGS. 3 and 4, the first ring gear 130 may include a first internal diameter in an area where the first planet gears 132 are received, and a second internal diameter that is greater than the first internal diameter that receives the first carrier 134. This recessed feature of the first carrier 134 provides for a stronger design and may also assist in retaining grease or other lubricant in the first ring gear 130 and around the first planet gears 132.

The first carrier 134 can operatively couple to the second gear train 124, via the first gear portion 138 to sequentially couple the first gear train 122 to the second gear train 124. The second gear train 124 includes a second internal/ring gear 140, second planet gears 142 disposed in the second ring gear 140, and a second carrier 144. The second ring gear 140 includes second gear teeth disposed on an interior surface of the second ring gear 140. The second planet gears 142 similarly include gear teeth disposed on an exterior surface of each of the second planet gears 142 that mate with the second gear teeth of the second ring gear 140. The gear teeth of the second planet gears 142 also mate with gear teeth of the first gear portion 138 of the first carrier 134. While six second planet gears 142 are shown in the exemplary embodiment, one of ordinary skill in the art will recognize that the number of second planet gears 142 is not so limited and more or less second planet gears 142 may be implemented. For example, the number of second planet gears 142 may be a multiple of the number of first planet gears 132.

Further, like the first ring gear 130, the second ring gear 140 may also be cup-like shaped with a second end portion 141 that is disposed proximal to the first carrier 134. The second end portion 141 along with the sides of the second ring gear 140 form the cup-like shape, and this cup-like shape allows the second ring gear 140 to receive and retain the second planet gears 142. The second end portion 141 also includes an aperture that receives and allows the first gear portion 138 to be disposed in engagement with the second planet gears 142. The second end portion 141 may be flat and abut an end of the first ring gear 130 and/or the first carrier 134, and assist in holding the second ring gear 140 axially aligned with the motor 116.

The second carrier 144 includes second gear protrusions or carrier pins 146 that engage respective ones of the second planet gears 142. The second carrier 144 also operatively couples with the gear teeth of the crank shaft gear 128. The crank shaft 126 can then provide the rotational force or torque to a drive gear and to the drive 110 for application to an accessory, such as a socket, and then to a work piece.

The second carrier 144 may also be recessed or disposed in an opening/cut-out in the second ring gear 140, as shown in FIG. 3, to further eliminate unnecessary parts to join or hold the components of the internal gear assembly and simplify the design of the tool 100. For example, as shown in FIGS. 3 and 4, the second ring gear 140 may include a first internal diameter in an area where the second planet gears 142 are received, and a second internal diameter that receives the second carrier 144. In a similar manner as described above, this recessed feature of the second carrier 144 provides for a stronger design and may also assist in retaining grease or other lubricant in the second ring gear 140 and around the second planet gears 142.

In an embodiment, the first gear train 122 and second gear train 124 may include components that are substantially the same to simplify manufacturing or assembly of the tool 100 and reduce rotation of the components to allow motion to be transferred to the ratchet head assembly 106, as desired. In other words, the first ring gear 130 may be substantially similar to the second ring gear 140, and the first planet gears 132 may be substantially similar to the second planet gears 142. In addition, the first carrier pins or first gear protrusions 136 may be substantially similar to the second carrier pins or second gear protrusions 146. Using substantially similar components allows the manufacturing or assembly of the tool 100 to be simplified and eliminates unnecessary parts to join these components.

As illustrated, the crank shaft 126 extends from the ratchet head assembly 106 and is received by the ratchet housing 108. The ratchet housing 108 may also be adapted to house the first gear train 122 and second gear train 124, that operatively couple the motor 116 to the crank shaft 126 to drive the drive 110.

The ratchet housing 108 may also be coupled to the main housing 114. For example, the ratchet housing 108 may include one or more indents 148, and one or more shaped apertures 150 formed on a neck portion 150 that extends from an end of the ratchet housing 108 opposite the ratchet head assembly 106. The main housing 114 fits over the motor 116 and the neck portion 152 of the ratchet housing 108. The main housing 114 may include one or more shaped protrusions 154 protruding into an interior of the main housing 114, and is adapted to engage the one or more shaped apertures 150 to couple the ratchet housing 108 to the main housing 114. The main housing 114 may also include one or more bosses 156 protruding into an interior of the main housing 114, and is adapted to engage the one or more recesses 148 to couple the ratchet housing 108 to the main housing 114. The engagement of the shaped protrusions 154 and bosses 156, with the shaped apertures 150 and indents 148, respectively, couple the main housing 114 and ratchet housing 120 together, and resist axial and rotational movement of the ratchet housing 108 with respect to the main housing 114.

During operation, power is supplied to the motor 116 to cause the motor drive gear 118 to rotate. The drive gear 118 rotates the first planet gears 132 in the first ring gear 130, which thereby rotate the first carrier 134. The first gear portion 138 of the first carrier 134 rotates the second planet gears 142 in the second ring gear 140, which thereby rotate the second carrier 144. The second carrier 144 causes the crank shaft 126 to rotate and provide the rotational force or torque to a drive gear and to the drive 110.

Figure 5:
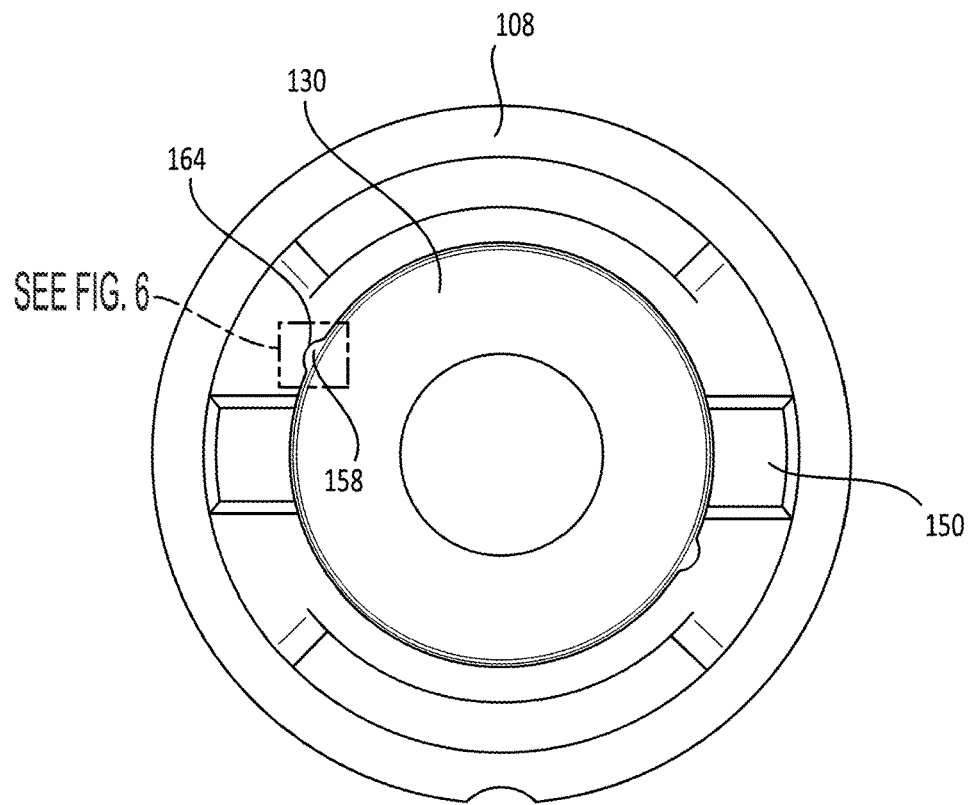
FIG. 5 is a side view of an internal gear and housing of the tool.
Figure 6:
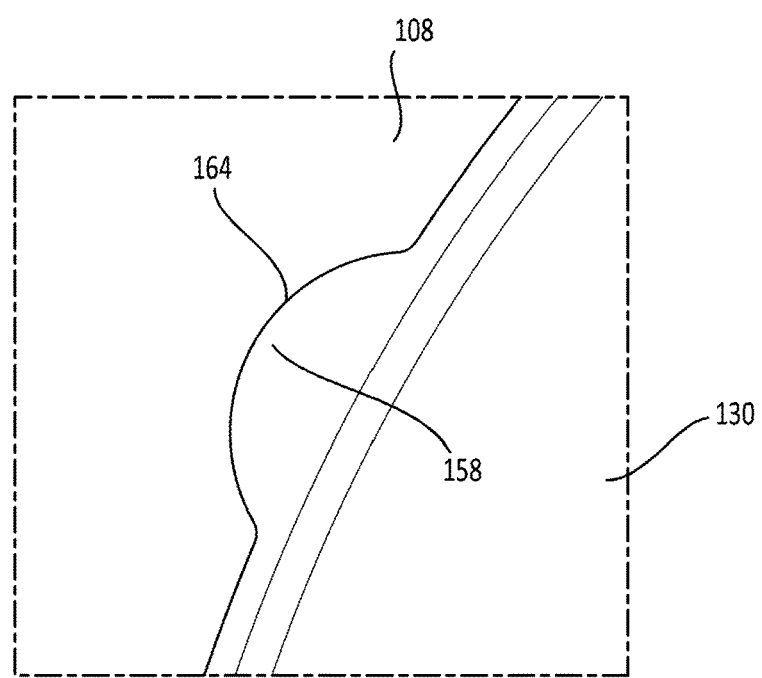
FIG. 6 is an enlarged perspective view of the internal gear and housing of FIG. 5, showing an enlarged section of the box notated "See FIG. 6" in FIG. 5.
Figure 7:
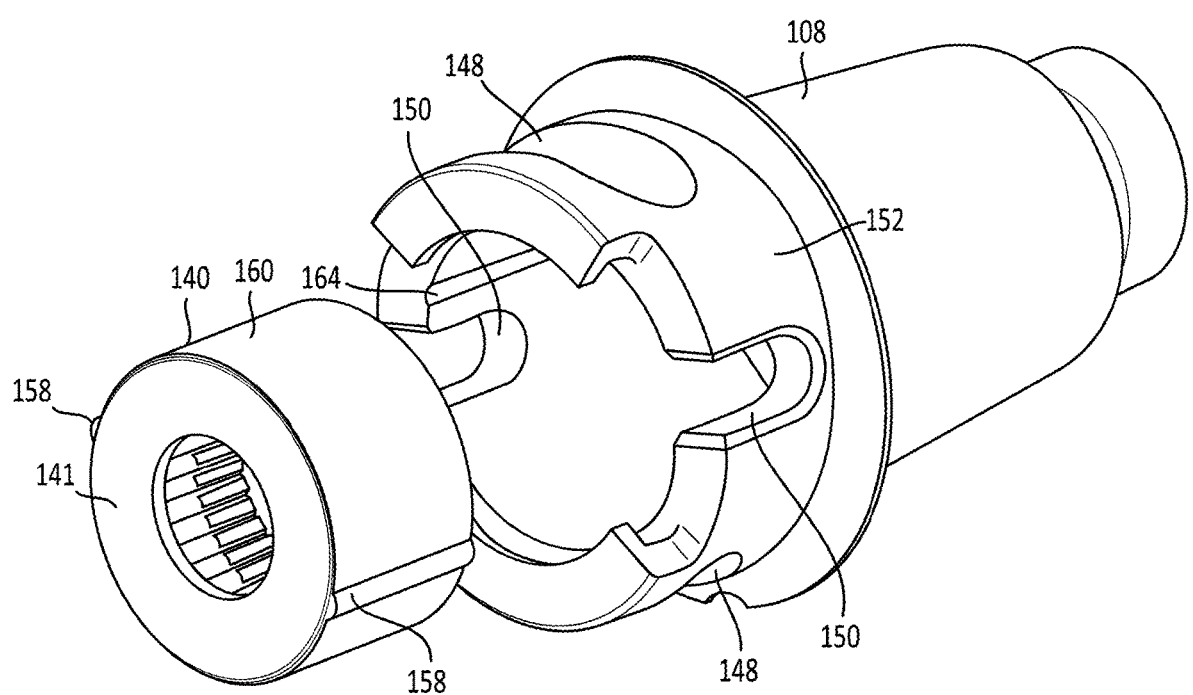
FIG. 7 is an exploded perspective view of the internal gear and housing of FIG. 5.

As discussed above, it is necessary for various components of the tool 100 to rotate to provide torque or rotational force from the motor 116 to the ratchet head assembly 106 and eventually to a work piece. However, it is preferable that the ratchet housing 108 and the internal gear assembly do not rotate relative to each other. For example, Referring to FIGS. 5-7, each of the first ring gear 130 and the second ring gear 140 may include one or more protrusions 158, extending axially along an outer surface 160 of the ring gears 130, 140. Similarly, the ratchet housing 108 may include one or more corresponding recesses 162 extending axially along an interior surface 164 of the ratchet housing 108. The protrusions 158 of the ring gears 130, 140 engage the corresponding recesses 162 to prevent rotational movement of the ring gears 130, 140 with respect to the ratchet housing 108, and assist in axially aligning the ring gears 130, 140 with the motor 116. The various components of the internal gear assembly (e.g., the gears or planet gears), and crank shaft 126 are not rotationally restricted by the components in such an embodiment. Rather, the ratchet housing 108 and the ring gears 130, 140 connection is rotationally restricted, as discussed above, and rotational motion/torque may be transferred to the drive 110, as desired.

As illustrated, there are two protrusions 158 that are disposed 180 degrees apart from each other, and two corresponding recesses 162 that are disposed 180 degrees apart from each other. However, more than two protrusions 158 and corresponding recesses 162 may be implemented.

As used herein, the term "coupled" and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having a housing and a motor for providing torque to a drive unit, the tool comprising:
   a first gear train adapted to receive torque from the motor, wherein the first gear train includes a first ring gear with a first end portion forming a first cup-like shape, and the first end portion is adapted to be disposed proximal to the motor; and
   a second gear train sequentially coupled to the first gear train and adapted to transfer torque from the first gear train to the drive unit, wherein the second gear train includes a second ring gear with a second end portion forming a second cup-like shape, and the second end portion is adapted to abut the first ring gear opposite the first end portion, and wherein the first and second ring gears are adapted to resist rotation with respect to the housing.

2. The tool of claim 1, wherein the first gear train includes:
first planet gears disposed in the first ring gear and operably coupled to the motor; and
a first carrier coupled to the first planet gears, wherein the first carrier is adapted to transfer torque from the motor to the second gear train.

3. The tool of claim 2, wherein the first planet gears includes three first planet gears.

4. The tool of claim 2, wherein the first carrier is received in an opening in the first ring gear.

5. The tool of claim 2, wherein the first ring gear includes a first protrusion extending from an outer surface of the first ring gear, and the housing further comprises a ratchet housing with a recess adapted to receive the first protrusion to resist rotation of the first ring gear with respect to the ratchet housing.

6. The tool of claim 2, wherein the second gear train includes:
second planet gears disposed in the second ring gear and operably coupled to the first carrier; and
a second carrier coupled to the second planet gears, wherein the second carrier is adapted to transfer torque from the first gear train to the drive unit.

7. The tool of claim 6, wherein the second planet gears include a number of second planet gears that is a multiple of a number of the first planet gears.

8. The tool of claim 6, wherein the second carrier is received in an opening in the second ring gear.

9. The tool of claim 6, wherein the first and second planet gears are substantially similar to each other.

10. The tool of claim 6, wherein the second ring gear includes a second protrusion extending from an outer surface of the second ring gear, and the tool housing further comprises a ratchet housing with a recess adapted to receive the second protrusion to resist rotation of the second ring gear with respect to the ratchet housing.

11. A gear assembly for a tool having a motor for providing torque to a drive unit, the gear assembly comprising:
a first gear train adapted to receive torque from the motor, the first gear train including:
a first ring gear having a first internal diameter and a second internal diameter greater than the first internal diameter;
first planet gears disposed in the first ring gear at the first internal diameter and operably coupled to the motor; and
a first carrier disposed in the first ring gear at the second internal diameter and coupled to the first planet gears; and
a second gear train sequentially coupled to the first gear train, wherein the second gear train is adapted to receive torque from the first gear train, the second gear train including:
a second ring gear;
second planet gears disposed in the second ring gear and operably coupled to the first carrier; and
a second carrier coupled to the second planet gears, wherein the second carrier is adapted to receive torque from the first gear train and transfer torque to the drive unit.

12. The gear assembly of claim 11, wherein the first planet gears includes three first planet gears.

13. The gear assembly of claim 11, wherein the first ring gear includes first protrusions extending from an outer surface of the first ring gear that are adapted to engage a housing of the tool and resist rotation of the first ring gear with respect to the housing.

14. The gear assembly of claim 11, wherein the second planet gears includes a number of second planet gears that is a multiple of a number of the first planet gears.

15. The gear assembly of claim 11, wherein the second carrier is disposed in an opening in the second ring gear.

16. The gear assembly of claim 11, wherein the second ring gear includes second protrusions extending from an outer surface of the second ring gear that are adapted to engage a housing of the tool and resist rotation of the second ring gear with respect to the housing.

17. A tool having a motor for providing torque to a drive unit, the tool comprising:
an outer housing including a recess in an interior surface of the outer housing;
a first gear train that is disposed in the outer housing and adapted to receive torque from the motor, the first gear train including:
a first ring gear including a first protrusion extending axially along an outer surface of the first ring gear, wherein the first protrusion is adapted to engage the recess and resist rotation of the first ring gear with respect to the outer housing; and
a second gear train sequentially coupled to the first gear train, wherein the second gear train is adapted to receive torque from the first gear train and transfer torque to the drive unit, the second gear train including:
a second ring gear including a second protrusion extending axially along an outer surface of the second ring gear, wherein the second protrusion is adapted to engage the recess and resist rotation of the second ring gear with respect to the outer housing.

18. The tool of claim 17, wherein the first gear train includes:
first planet gears disposed in the first ring gear and operably coupled to the motor and first protrusions extending from an outer surface of the first ring gear; and
a first carrier coupled to the first planet gears and recessed in an opening in the first ring gear, the first carrier is adapted to receive torque from the motor.

19. The tool of claim 18, wherein the second gear train includes:
second planet gears disposed in the second ring gear and operably coupled to the first carrier; and
a second carrier coupled to the second planet gears and recessed in an opening in the second ring gear, wherein the second carrier is adapted to receive torque from the first gear train and transfer torque to the drive unit.

* * * * *